United States Patent Office 3,541,048
Patented Nov. 17, 1970

3,541,048
HIGH MOLECULAR WEIGHT POLYBENZ-1,3-
OXAZINE-2,4-DIONES
Rudolf Binsack and Ludwig Bottenbruch, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed Dec. 30, 1968, Ser. No. 788,065
Claims priority, application Germany, Jan. 8, 1968, 1,720,774
Int. Cl. C08g 22/04
U.S. Cl. 260—47
2 Claims

ABSTRACT OF THE DISCLOSURE

High molecular weight polybenz-1,3-oxazine-2,4-diones having recurring structural units of the formula

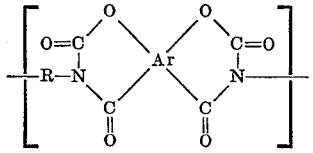

wherein Ar is a tetravalent aromatic radical derived from an o,o'-dihydroxy aromatic dicarboxylic acid, and R is a bivalent phenylene ether of the formula

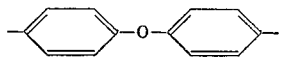

or

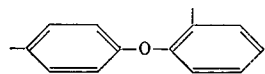

the phenylene ethers being present in the polybenzoxazine diones in a molar ratio of 1:9 to 9:1.

---

This invention relates to polybenzoxazine diones that are readily soluble in certain organic solvents.

Polybenz-1,3-oxazine-2,4-diones which are extremely resistant to heat and which are soluble in various solvents can be obtained by the cyclopolyaddition of diisocyanates with o, o'-dihydroxy aryl dicraboxylic acid esters. This reaction is conducted in aprotonic solvents in the presence of basic catalysts by a single-stage process as disclosed in Belgian patent specification No. 691,900. Sometimes, however, mixtures or diisocyanates and o,o'-dihydroxy aryl dicarboxylic acid esters have to be used in order to obtain a sufficiently soluble product which can be used for the production of films and filaments from solution. Thus, polybenz-1,3-oxazine-2,4-dione based on diphenyl ether-4,4'-diisocyanate and 4,4'-dihydroxy diphenyl-3,3'-dicarboxylic acid diphenyl ester is soluble in sulphuric acid and m-cresol, but is insoluble in dimethyl formamide, dimethyl acetamide or N-methylpyrrolidone. To obtain a sufficiently high solubility to allow processing from solution, 1,5-naphthylene diisocyanate (e.g. 15 mole percent) has to be added to the diphenyl ether-4,4'-diisocyanate. Unfortunately, this results in a considerable deterioration in the thermal stability of the polybenz-1,3-oxazine-2,4-dione. The same applies to the polybenz-1,3-oxazine-2,4-dione, based on diphenyl ether-4,4'-diisocyanate and hydroquinone-2,5-dicarboxylic acid diphenyl ester.

It is an object of this invention to provide new polybenz-1,3-oxazine-2,4-diones. It is another object of this invention to provide polybenz-1,3-oxazine-2,4-diones that are readily soluble in certain polar organic solvents. It is still a further object of this invention to provide polybenz-1,3-oxazine-2,4-diones, that are readily soluble and at the same time have an excellent heat resistance.

These objects are accomplished by high molecular weight, normaly solid polybenz - 1,3-oxazine-2,4-diones having recurring structural units of the general formula

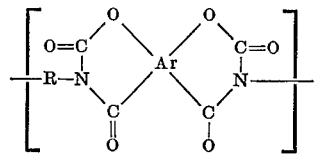

wherein Ar is a tetravalent aromatic radical derived from an o,o'-dihydroxy aromatic dicarboxylic acid, and R is a bivalent phenylene ether of the formula

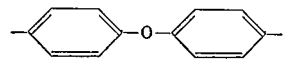

or

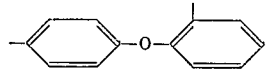

both of said phenylene ethers being present in said polybanz-1,3-oxazine-2,4-dione in a molar ratio of 1:9 to 9:1.

These polybenzoxazine diones are obtained by reaction of o,o'-dihydroxy aromatic dicarboxylic acid esters with a mixture of diphenylether-4,4'-diisocyanate and diphenyl ether-2,4'-diisocyanate in a molar ratio of from 1:9 to 9:1, the preferred range being from 1:4 to 4:1.

It is possible in this way to obtain polybenz-1,3-oxazine-2,4-diones which are soluble enough to be processed from solution without any reduction in their resistance to heat.

o,o'-Dihydroxy aromatic dicarboxylic acid esters that are suitable to be reacted with the mixture of diphenylethed diisocyanates are the alkyl-, cycloakyl- and preferably the arylesters, i.e. example 3,6-dihydroxyphthalic acid, resorcinol-2,4-dicarboxylic acid, resorcinol-4,6-dicarboxylic acid, 2,5-dihydroxy-terephthalic acid, 4,4'-dihydroxydiphenyl-3,3'-dicarboxylic acid, 4,4'-dihydroxy-5,5'-dimethyl-diphenyl-methane - 3,3' - dicarboxylic acid, 1,2-(3,3' - dicarboxy - 4,4'-dihydroxy - 5,5'-dimethyldiphenyl)-ethane, 4,4' - dihydroxydiphenylether - 3,3' - dicarboxylic acid, 4,4'-dihydroxydiphenylsulfide - 3,3'-dicarboxylic acid, 1,4-dihydroxy-2,3-dicarboxynaphthalene.

Preferably the arylesters of those o,o'-dihydroxy-aromatic dicarboxylic esters are used which have the general formula

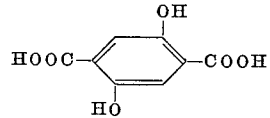

or

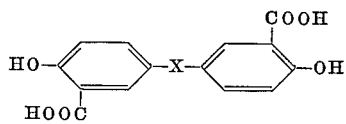

wherein X is a single bond, a methylene group, oxygen or sulfur.

The most preferred esters are the arylesters of 2,5-dihydroxy-terephthalic acid and 4,4' - dihydroxydiphenyl-3,3'-dicarboxylic acid.

The reaction components should be used, as far as possible in stoichiometric quantities, although it sometimes may be advantageous to use the diisocyanates and dihydroxy dicarboxylic acid esters in an excess of from 0.1 to 1 mol percent.

The reaction is preferably carried out in an inert solvent, e.g. in dimethyl formamide, dimethyl acetamide, tetramethylene sulphone, dimethyl sulfoxide, which may be used, if desired, in conjunction with other inert solvents such as aromatic hydrocarbons, e.g. benzene and toluene, aliphatic chlorinated hydrocarbons, e.g. methylene chloride, chloroform and tetrachloromethane, aromatic chlorinated hydrocarbons, e.g. chlorobenzene, aliphatic ethers, e.g. diethyl ether and diisopropyl ether or cyclic ethers, e.g. dioxan and tetrahydrofuran. Dimethyl sulfoxide is particularly suitable for use as the solvent because in this solvent the reaction proceeds quickly and smoothly.

The reaction is carried out at a temperature between about 20 and 200° C. and preferably at a temperature between about 80 and 120° C.

The reaction can be catalysed by tertiary amines, e.g. by triethyl amine, tributyl amine, pyridine, toluidine, quinoline, N-methylmorpholine, N-ethylmorpholine and triethylene diamine. The catalysts are used in quantities of from 0.01 to 1% and preferably in quantities of from 0.01 to 0.1%, based on the reaction components.

The reaction components and the solvents used must be extremely pure, in particular they should be substantially free from water because otherwise the molecular weights of the products obtained will be reduced. One suitable method of testing the water content is to add to the solvents an isocyanate at room temperature in vacuo. If any gas is being evolved, this means that the solvent is not sufficiently anhydrous for the reaction.

In order to avoid discolouration, the reaction may be carried out in the presence of inert gases, e.g. nitrogen.

The molecular weight of the polybenzoxazine diones obtained may be adjusted by the addition of o-monohydroxy aryl monocarboxylic acid esters, such as salicylic acid phenyl ester and o-cresotic acid phenyl ester.

The progress of the reaction may be monitored directly by observing the increase in solution viscosity. Another suitable method for monitoring the reaction is by using infra-red spectroscopy. The polybenz-1,3-oxazine-2,4-diones have characteristic absorption bands in the infra-red spectrum.

The reaction mixture may be worked up by various methods. It is often desirable to convert the reaction mixture directly into shaped elements such as films or filaments. The reaction mixture may, for example, be dry-cast into films or dry-spun into filaments. In cases where it is desired to isolate the polybenzoxazine diones, a precipitating agent is added to the reaction mixture. When solvents which are miscible with water are used, water may be used as the precipitating agent. It has proved desirable to use methylene chloride as the precipitating agent because in this case finely powdered products are obtained, which are easily washed and dried.

The process for the production of the polybenz-1,3-oxazine-2,4-diones according to the invention may be carried out according to the following preferred procedure:

A mixture of the diphenyl ether diisocyanates is dissolved in dimethyl sulfoxide; o,o'-dihydroxy aryl dicarboxylic acid ester is then added to the resulting solution and this is heated with stirring to about 80° C. A catalytic quantity of the tertiary amine is added, and heating is continued at 100° C. The polymer usually reaches its final molecular weight after 1 hour at most. Methylene chloride is added with stirring to the polymer solution, the powdery product filtered off, washed thoroughly with methylene chloride and dried at about 100° C. under reduced pressure.

Depending upon the particular composition, the polybenz-1,3-oxazine-2,4-diones are high-melting or even non-melting polymeric substances. They have outstanding resistance to high temperatures, even in the presence of air. They do not dissolve or swell in most solvents, and are unaffected by acid and basic reagents. They may be worked up from solutions in m-cresol, dimethyl formamide, dimethyl acetamide, N-methyl pyrrolidone, dimethyl sulphoxide or mixtures thereof into transparent shaped elements such as foils or filaments. They show outstanding mechanical and electrical properties.

The following Table 1 shows the solubility of the polybenz-1,3-oxazine-2,4-diones based on 4,4'-dihydroxy diphenyl-3,3'-dicarboxylic acid diphenyl ester and mixtures of diphenyl ether-4,4'- and -2,4-diisocyanate.

TABLE 1

| 4,4'-D, mol percent | 2,4'-D, mol percent | Solubility, 5% in— | | | | |
|---|---|---|---|---|---|---|
| | | $H_2SO_4$ | m-Cresol | DMAC | NMP | DMF |
| 100 | 0 | + | + | − | − | − |
| 90 | 10 | + | + | + | + | − |
| 80 | 20 | + | + | + | + | − |
| 70 | 30 | + | + | + | + | + |
| . | . | . | . | . | . | . |
| . | . | . | . | . | . | . |
| . | . | . | . | . | . | . |
| 0 | 100 | + | + | + | + | + |

NOTE:
D = Diphenylether diisocyanate.
DMAC = Dimethylacetamide.
NMP = N-methylpyrrolidone.
DMF = Dimethyl formamide.

TABLE 2

[Comparison of the stability of foils of different polybenzoxazine-diones which have been stored at 275° C. in the atmosphere]

| Composition of the diisocyanate used | | | Solvent for casting sheets | Period within which the foils remain elastic |
|---|---|---|---|---|
| Percent N | Percent 4,4'-D | Percent 2,4'-D | | |
| 20 | 80 | | DMF | 3 weeks. |
| | 100 | | m-Cresol | 7 weeks. |
| | 80 | 20 | DMAC | 6 weeks. |
| | 60 | 40 | DMF | Do. |
| | 40 | 60 | DMF | Do. |
| | 20 | 80 | DMF | 3 weeks. |
| | | 100 | DMF | 1 week. |

NOTE.—N = Naphthylene-1,5-diisocyanate.

TABLE 3

[Determination of the mechanical strength of the polybenzoxazine-dione foil with 40% of 2,4'- and 60% of 4,4'-diphenylether substitution upon storage at 275° C. in the atmosphere]

| Test | Dimension | Initial value | Tempering at 275° C. in the atmosphere | | | |
|---|---|---|---|---|---|---|
| | | | 1 week | 2 weeks | 4 weeks | 6 weeks |
| Yield strength in tension | Kp./cm.² | 1,160 | 1,210 | 1,090 | 820 | (¹) |
| Elongation at yield point | Percent | 8.0 | 9.6 | 8.1 | 6.3 | (¹) |
| Ultimate stress | Kp./cm.² | 1,240 | 1,160 | 1,095 | 1,060 | 1,092 |
| Breaking tension | Percent | 112 | 76 | 14 | 7 | 6 |
| E-modulus of elasticity from tensil test | Kp./cm.² | 26,600 | 25,200 | 24,800 | 26,800 | 35,500 |

¹ Not determined.

TABLE 4

[Determination of the shear modulus and the mechanical dissipation factor in the torisional oscillation test on a poly-benzoxazine-dione foil with 40% of 2,4'- and 60% of 4,4'-diphenylether substitution in dependence on the temperature]

| Temperature, ° C. | Shear modulus G, dyn./cm.² | Mechanical dissipation factor, tan δ |
|---|---|---|
| −100 | $1.5 \cdot 10^{10}$ | 0.011 |
| −60 | $1.4 \cdot 10^{10}$ | 0.013 |
| −20 | $1.3 \cdot 10^{10}$ | 0.014 |
| +20 | $1.3 \cdot 10^{10}$ | 0.014 |
| +60 | $1.3 \cdot 10^{10}$ | 0.013 |
| +100 | $1.2 \cdot 10^{10}$ | 0.013 |
| +140 | $1.2 \cdot 10^{10}$ | 0.013 |
| +180 | $1.1 \cdot 10^{10}$ | 0.013 |
| +220 | $1.0 \cdot 10^{10}$ | 0.014 |
| +260 | $0.92 \cdot 10^{10}$ | 0.019 |
| +300 | $0.87 \cdot 10^{10}$ | 0.027 |
| +340 | $0.80 \cdot 10^{10}$ | 0.040 |
| +380 | $0.75 \cdot 10^{10}$ | 0.050 |

TABLE 5

[Determination of the specific resistance, dielectric constant and dissipation factor on a polybenzoxazine-dione foil with 20% of 2,4'- and 80% of 4,4'-diphenylether substitution in dependence on the temperature]

| Temperature, °C. | Specific resistance, Ω·cm. | Dielectric constant, DK | Dielectric dissipation factor, tan δ |
|---|---|---|---|
| 20 | 3·10¹⁶ | 3.5 | 0.0011 |
| 100 | 8·10¹⁶ | 3.0 | 0.0018 |
| 150 | 4·10¹⁶ | 3.0 | 0.0028 |
| 200 | 9·10¹⁴ | 3.0 | 0.0022 |
| 250 | 4·10¹³ | 3.0 | 0.0022 |

The following examples are to further illustrate the invention without limiting it.

EXAMPLE 1

20.18 parts by weight of diphenyl ether-4,4'-diisocyanate and 5.04 parts of diphenyl ether-2,4'-diisocyanate are dissolved in 250 parts by weight of anhydrous dimethyl sulfoxide and the resulting solution is heated to 85° C. 42.46 parts by weight of 4,4'-dihydroxy diphenyl-3,3-dicarboxylic acid diphenyl ester and 0.08 part by weight of triethylene diamine are then added and the solution is heated with stirring to 100° C. After 1 hour, the solution has reached its maximum viscosity. It is then allowed to cool to 35° C., the polybenzoxazine dione formed is precipitated by adding three times the solvent's volume of methylene chloride, filtered, washed with methylene chloride and dried in vacuo at 100° C.

The reaction product is soluble in sulphuric acid, m-cresol, dimethyl sulfoxide, dimethyl acetamide and N-methyl pyrrolidone and is almost insoluble in dimethyl formamide. It is totally insoluble in for example aliphatic, aromatic and chlorinated hydrocarbons, dioxan, tetrahydrofuran, acetone and ethyl acetate. The product has a relative solution viscosity of $\eta_{rel}=3.18$, measured in a sulfuric acid solution at 25° C., having a concentration of 1 g./100 ml. of solution. Films cast from a solution in dimethyl acetamide are colourless and transparent, and retain their elasticity after one month's storage in air at 275° C.

EXAMPLE 2

15.13 parts by weight of diphenyl ether-4,4'-diisocyanate and 10.09 parts by weight of diphenyl ether-2,4'-diisocyanate are dissolved in 250 parts of anhydrous dimethyl sulfoxide and the resulting solution is heated to 85° C. 42.64 parts by weight of 4,4'-dihydroxydiphenyl-3,3'-dicarboxylic acid diphenyl ester and 0.08 part by weight of triethylene diamine are then added and the solution heated with stirring to 100° C. The solution reaches its maximum viscosity after 30 minutes. The rest of the procedure is then as described in Example 1.

The reaction product is soluble in sulfuric acid, m-cresol, dimethyl sulfoxide, dimethyl formamide, dimethyl acetamide and N-methylpyrrolidone, but is insoluble in for example, aliphatic, aromatic and chlorinated hydrocarbons, dioxan, tetrahydrofuran, acetone and ethyl acetate. The product has a relative solution viscosity of $$\eta_{rel}=2.98$$

in a sulfuric acid solution at 25° C. having a concentration of 1 g./100 ml. of solution. Films cast from a solution in dimethyl formamide are colourless and transparent and retain their elasticity after 3 months' storage in air at 250° C.

EXAMPLE 3

7.57 parts by weight of diphenyl ether-4,4'-diisocyanate and 17.66 parts by weight of diphenyl ether-2,4'-diisocyanate are dissolved in 250 parts by weight of anhydrous dimethyl sulfoxide and the resulting solution is heated to 85° C. 42.6 parts by weight of 4,4'-dihydroxyphenyl-3,3'-dicarboxylic acid diphenyl ester and 0.8 part by weight of triethylene amine are then added after which the solution is heated with stirring to 102° C. The solution reaches its maximum viscosity after 45 minutes. The rest of the procedure is then as described in Example 1.

The reaction product is soluble in sulfuric acid, m-cresol, dimethyl sulfoxide, dimethyl formamide, dimethyl acetamide and N-methylpyrrolidone but is insoluble in for example, aliphatic, aromatic and chlorinated hydrocarbons, dioxan, tetrahydrofuran, acetone and ethyl acetate. The product has a relative solution viscosity of $\eta_{rel}=1.54$, measured in a dimethyl formamide solution at 25° C. having a concentration of 1 g./100 ml. of solution. Films cast from a dimethyl formamide solution are colourless and transparent and retain their elasticity after 3 months' storage in air at 275° C.

EXAMPLE 4

5.04 parts by weight of diphenylether-4,4'-diisocyanate and 20.18 parts by weight of diphenyl ether-2,4'-diisocyanate are dissolved in 250 parts by weight of anhydrous dimethyl sulfoxide. The resulting solution is heated to 90° C. and 35.03 parts by weight of 2,5-dihydroxy terephthalic acid diphenyl ester and 0.08 part by weight of triethylene diamine are then added after which the solution is heated with stirring to 104° C. The solution reaches its maximum viscosity after 20 minutes. The rest of the procedure is then as described in Example 1.

The reaction product is soluble in for example, concentrated sulfuric acid, dimethyl sulfoxide and N-methylpyrrolidone, but insolulbe in the solvents mentioned in Example 1. The product has a relative soltuion viscosity of $\eta_{rel}=2.04$, measured in a sulfuric acid solution at 25° C. having a concentration of 1 g./100 ml. of solution. It can be cast into transparent films from an N-methylpyrrolidone solution.

What we claim is:

1. A high molecular weight, normally solid polybenz-1,3-oxazine-2,4-dione consisting essentially of recurring structural units of the general formula

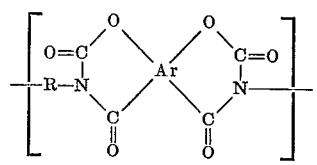

wherein Ar is a tetravalent aromatic radical of the formula

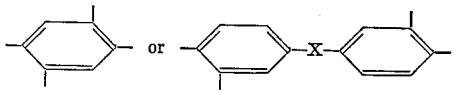

wherein X is a single bond, —CH₂—, oxygen or sulfur; and R is a bivalent phenylene ether of the formula

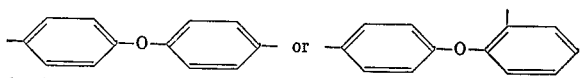

both of said phenylene ethers being present in said polybenz-1,3-oxazine-2,4-dione in a molar ratio of 1:9 to 9:1.

2. The high molecular weight polybenz-1,3-oxazine-2,4-dione of claim 1, wherein Ar is a tetravalent aromatic radical of the formula

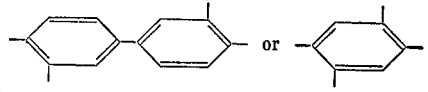

and said phenylene ethers being present in said polybenz-1,3-oxazine-dione in a molar ratio of 1:4 to 4:1.

References Cited

UNITED STATES PATENTS 3,244,675    4/1966    Angelo _____ 260—77.5

WILLIAM H. SHORT, Primary Examiner

L. L. LEE, Assistant Examiner

U.S. Cl. X.R.

260—30.8, 32.4, 32.6, 33.4, 77.5, 78.4